Nov. 6, 1962            D. M. HEATH            3,062,228
METHODS AND APPARATUS FOR CONTROLLING THE LIQUID LEVEL
IN A WET STORAGE SYSTEM FOR SOLUBLE MATERIAL
Filed Feb. 2, 1960

INVENTOR.
Donald M. Heath
BY

United States Patent Office 3,062,228
Patented Nov. 6, 1962

3,062,228
METHODS AND APPARATUS FOR CONTROLLING THE LIQUID LEVEL IN A WET STORAGE SYSTEM FOR SOLUBLE MATERIAL
Donald M. Heath, La Grange, Ill., assignor to Morton Salt Company, Chicago, Ill., a corporation of Illinois
Filed Feb. 2, 1960, Ser. No. 6,276
10 Claims. (Cl. 137—1)

This invention relates to improvements in the wet storage of soluble material and saturated solutions thereof and, more particularly, to improved methods and apparatus for controlling the liquid level in a storage chamber for such material relative to the top surface of the mass of material disposed within such chamber.

It is the practice, for example, among industrial consumers of common salt (sodium chloride) used in making saturated brine to receive shipments of loose, bulk salt in carload and/or truckload quantities. In such instances, these shipments are customarily made directly to the plant sites of the consumers where the salt is stored for subsequent use in large concrete, steel or wood chambers which may be located either adjacent to, or remote from, the point of brine use in the plant. These chambers are usually made fully water-tight and are provided with suitable water inlet means. The storage chambers perform two basic functions: (1) providing adequate storage for the salt between bulk deliveries thereof, and (2) providing continuous make-up of saturated brine as it is utilized in the plant operation.

The size of the storage chambers will generally be governed by the rate and amount of brine consumption in the particular manufacturing or processing operation, the availability of the bulk deliveries, and the practical and convenient quantity of each bulk delivery. As a general rule, the chamber capacity will be from 1½ to 4 times the volume of the selected bulk delivery. The rate and amount of brine consumption in a given manufacturing or processing operation is a factor which is predetermined regardless of the type of method and/or apparatus utilized for storing of the wet salt.

Because of the inherent characteristics of sodium chloride, well known to those in the brine making art, as to its substantially uniform solubility in water over a wide temperature range; for example, for 100 parts of water, 35.7 parts of salt at 32° F.; 35.8 parts of salt at 50° F.; 36 parts of salt at 68° F.; and 36.3 parts of salt at 86° F.; it is common practice in the utilization of wet salt storage systems as a means of storage and brine making to know the salt and water requirements to produce the necessary saturated brine by merely observing or noting the amount of brine consumed in the given manufacturing or processing operation over a predetermined length of time.

As can be understood, if these systems are to perform the function of continuous saturated brine make-up, a supply of water must be maintained in the storage chamber adequate to the use and the amount of salt being stored. When granulated salt is being stored, the amount of water in the storage chamber should cover the salt supply at all times to prevent caking and hardening thereof. Having the mass of salt completely submerged within water will not adversely affect the amount of salt used or the solubility characteristics of the undissolved submerged salt because of the inherent characteristic of salt to the effect that only so much salt will dissolve in water to produce a saturated brine solution. The general rule in this regard is that it takes approximately 2½ lbs. of salt to produce one gallon of saturated brine. On the other hand, rock salt in such a chamber dissolves efficiently and uniformly if the liquid contacts only a small portion of the salt being stored. Thus, the location of the water inlet, the control of the liquid height in the chamber, the size of the water supply lines, and the rate of water flow through such supply lines, will vary according to the form of salt being stored and the use to be made thereof.

Additionally significant is the fact that in wet salt storage systems it has been found that the incoming liquid (water) must pass or filter through a salt bed for a distance of from six inches to ten inches in order for a saturated brine to be produced.

It is clear from the foregoing that the maintenance of a proper liquid level in a wet storage chamber relative to the height of the salt bed therein is exceedingly important, especially with respect to the storage of granulated salt. To maintain a suitable liquid level, various water control devices have been used but, as will be shown hereinafter, these control devices were, for the most part, inadequate.

One common method of maintaining the water level above a granulated salt mass in a storage chamber is the utilization of a mechanically actuated float valve. This valve, normally located within the salt chamber itself, but sometimes baffled from the salt chamber by a liquid-transmitting well or float box, maintains a permanent liquid level within the chamber without regard to the amount of salt being stored therein and is, therefore, beset with numerous shortcomings. One such shortcoming, namely, brine overflow and consequent brine loss, is caused by the need to maintain the permanent liquid level in the storage chamber at a relatively high position in order to utilize the capacity of the salt chamber in an effective and economical manner. Under such a situation overflow occurs when the salt supply is replenished. Brine overflow is not only likely to cause brine loss, but also to result in damage to the property surrounding the chamber. Although this shortcoming may be alleviated to a substantial extent by the exercise of care by competent personnel in manually reducing the liquid level prior to the delivery of the replenishing salt, such a remedy is expensive and requires close scheduling of salt deliveries.

Another shortcoming due to the maintenance of a predetermined liquid level within the chamber, is that brine dilution might occur unless caution is exercised by operating personnel to determine the amount of salt supply existing therein. This determination is normally accomplished by making frequent probes into the chamber with calibrated measuring sticks and the like. As is the case with the remedy for brine overflow, possible human error is ever present.

A further and very serious shortcoming associated with a mechanically actuated float valve results from the considerable surface evaporation which often occurs on the float whether it is located in the storage chamber, in a liquid transmitting well, or in a float box. Such evaporation leaves many reformed salt crystals on the surface of the float which grow in number and weight. The added weight will eventually actuate the float downward, opening the valve operated thereby, and cause excess solvent to be drawn into the chamber. Thus, continuous overflow of the chamber occurs with the resultant losses, as aforenoted.

Another shortcoming of these float valves is their need to be expensively protected against unusual freezing conditions. When exposed to excessive cold, the unprotected valve body will fracture, resulting in complete lack of automatic control and consequent brine overflow.

Corrosion of the brass, steel and cast-iron parts caused by the presence of salt, salt dust, salt splash and brine represents still a further shortcoming of the mechanically actuated float valve. It is almost inevitable that any maintenance program set up to keep such parts of a movable nature free and acting will eventually fail and the float valve will become inoperative. Such inoperativeness not only may lead to brine overflow, but may also result in the wet salt storage system being completely drained of its water or brine reserve. This latter consequence often causes serious damage to pumps, pump motors, brine valves or other brine-related equipment.

Another means of liquid level control is the electrically operated probe switch. This device, however, is subject to many of the same disadvantages as the mechanical float valve since it, too, must be located in contact with the brine and requires the maintenance of a permanent liquid level at a relatively high position. The problems of brine loss and brine dilution exist when this control means is employed in much the same way as they do when the liquid level is governed by a float valve.

In addition, surface evaporation, brine splash, corrosion and pitting cause changes on the surface of the probe and consequent changes in its electrical conductivity which ultimately result in defective operation of the probe switch and water inlet valve connected thereto. Thus, unless the probe is constantly readjusted, the electrical probe switch will, in time, become an unreliable liquid level control device.

Perhaps the most serious disadvantage of the probe switch, from a practical standpoint, is its excessive cost, emanating from its need to be provided with moisture-proof shielding, insulating and switch housings, in order to insure its adequate performance.

Accordingly, it is an object of this invention to provide a liquid level control in wet storage systems for soluble material which will avoid the problems aforementioned.

It is a further object of this invention to provide a liquid level control system which will maintain the supply of liquid in relationship to the amount of soluble material and solution thereof being used by the consumer.

It is still a further object of this invention to provide a liquid level control system which will maintain the liquid level in the storage chamber relative to the top of the mass of soluble material therein.

It is a still further object of this invention to provide a liquid leveling means in wet storage systems that utilizes conventional well known components which are readily available from numerous sources; is relatively inexpensive to install and to maintain; does not require the talents of a highly skilled technician; and implements the inherent characteristics of sodium chloride in a facile manner which may be readily adapted to the needs of a wide variety of brine consuming operations.

Further and additional objects will become manifest from the description and claims hereinafter provided.

Prior to carrying out the fundamentals of this invention, measurements are made, generally through measuring apparatus which in many instances is self-contained in the brine consuming equipment itself, or through data supplied by the manufacturer and/or installer of such equipment, to determine the amount of brine used in the plant operation over a given period of time. From these measurements coupled with the inherent water soluble characteristics of salt a ratio can readily be determined between the volume of salt and volume of inlet water required for the brine making system. Where, however, the salt storage and brine making chamber is located in areas subject to extreme temperatures either high or low, adjustments in the ratio as to the incoming water can be made accordingly. By utilizing proper equipment, the aforesaid ratio may then be constantly maintained in the particular system.

Because brine is used under varying conditions in certain plant operations, it is immediately apparent that more than one set or arrangement of control equipment is required to accomplish the principles of the present invention. A typical arrangement will employ a timing device together with a solenoid valve positioned on the water inlet conduit, which timing device will periodically actuate the solenoid valve so as to permit solvent at a predetermined rate to enter the brine storage chamber. The timing device may be either automatically actuated by an electrical impulse emanating from the brine use system, or it may be initiated by an independent electrical source; and in certain applications no timing device is necessary, the solenoid valve being connected directly to the control means operating the brine use system.

For a more complete understanding of this invention the following drawings are provided wherein.

Figure 1:
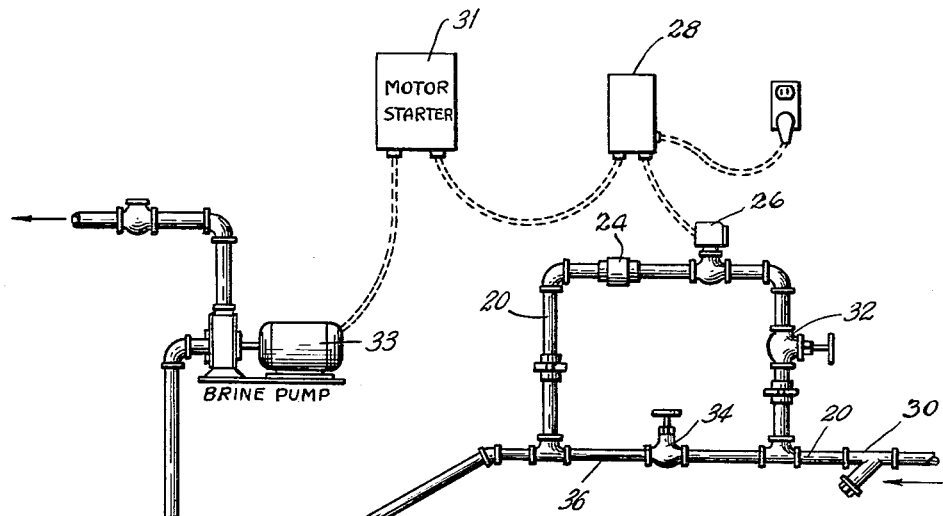
FIGURE 1 is a diagrammatic view of one embodiment of the apparatus of this invention utilized in conjunction with a wet salt storage system.

Referring now to the drawings and, particularly, to FIG. 1, a representative wet salt storage system is provided. The system includes a chamber 10, which may be disposed either above or below ground, wherein salt 12 and brine 14 are being stored. The chamber 10 is usually constructed of concrete, steel or wood and is fully water-tight except for openings 10a and 10b disposed in the upper surface thereof through which the delivered salt may be introduced directly into the interior of the chamber. These openings are normally closed by suitable covers. In the chamber as illustrated, an inert gravel supporting bed 16 is provided. Collecting sections 18 of Transite pipe, drain tile, porous wall drain pipe, or the like, are uniformly arranged within the area of the chamber beneath the bed 16, to effect brine collection. These sections communicate with an outlet 18 disposed adjacent the bottom of the chamber. Adjacent the top of chamber 10 is a solvent inlet conduit 20, which evenly distributes the incoming solvent above the liquid level 22.

Located on the inlet conduit 20, and remotely disposed with respect to the chamber interior wherein the mass of soluble material is located, is a flow control valve 24 which regulates the rate of flow of the incoming solvent and a solenoid valve 26 which controls the flow of solvent through valve 24. This solenoid valve is regulated by a timing device which may be either an automatic reset timer 28, shown in FIG. 1, or a program timer 29, shown in FIG. 2, depending upon the nature of the particular brine use. To protect the solenoid and flow control valves, a strainer 30 may be provided which removes the impurities present in the incoming solvent.

Valve 24 may be one of many conventional well known types of valves suitable for this purpose. One such valve would be a restrictive-orifice-type flow control valve fitted with a flexible rubber-type orifice which enlarges under low pressure conditions and contracts under high pressure conditions maintaining a relatively constant flow over a wide pressure range. Another conventional type of valve suitable for this purpose would be a common globe valve equipped with a 4-V notched closure insert. When solvent supply pressures throughout the supply system are maintained relatively constant, this latter type of flow control valve may be used to provide as an added feature adjustability for varying the solvent flow.

Valve 26 may be of a conventional well known type electrically operated solenoid valve of which there are a large number presently available on the market. When electrical current is directed to the solenoid of the valve, it moves a diaphragm or stem out of the closure position. When current is terminated at the solenoid, the stem or seat closes by spring force.

Solvent strainer 30 shown in FIG. 1 is an ordinary Y-type strainer used to protect orifices and valve closure seats from becoming deposited and encrusted with solvent borne particles and thus preventing them from malfunctioning.

Valves 32 and 34 are conventional manual type valves, such as ordinary globe valves. Normally, valve 32, located on line 20, is open and valve 34 on by-pass 36 is closed, allowing automatic operation of the level control system. The employment of valve 34 and by-pass 36 is a common practice in this art to facilitate servicing of the solenoid valve or flow control valve or to manually control the liquid level. When such servicing or manual controlling is required, valve 32 is closed and valve 34 is opened. Both the valves may be closed to manually stop the incoming flow of water so as to enable the interior of the chamber to be cleaned out or repaired.

Figure 2:
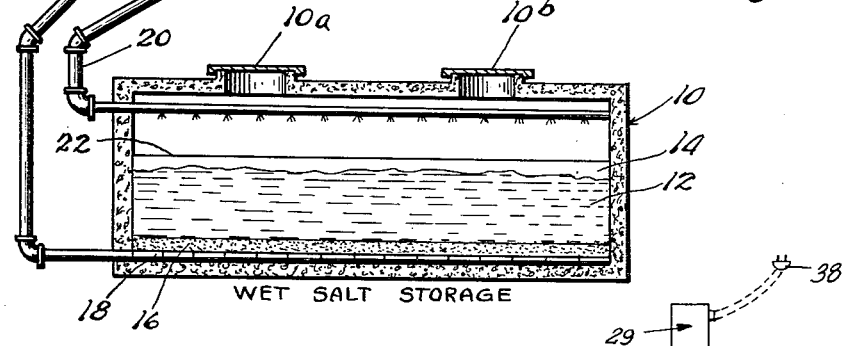
FIG. 2 illustrates a modification of the embodiment of FIG. 1.

Many manufacturing concerns, which utilize brine in the production of their products, require regularly repeated specific volumes of saturated brine in order to carry out their processes. These processes generally employ an electrical circuit to operate the cycle of use of the brine: that is to say, the brine is introduced into the manufacturing process by an electrical motor, switch or other well known device, and such device is operated by conventional electrical control means. FIG. 1 shows the embodiment of this invention which may be used in conjunction with such a process. The automatic reset timer 28 may be wired to control means 31, operating the brine pump 33, so that timer 28 will receive an electrical impulse from control means 31 each time brine is introduced into the manufacturing process. This impulse will initiate the timer 28; and the latter will open the solenoid valve 26 for a previously adjusted time period, causing the desired quantity of fresh fluid to be introduced through the pre-set flow control valve 24. The length of the time period and the amount of incoming solvent allowed to flow per minute through the flow control valve 24 will be dependent upon the amount of solvent removed by the brine used during each cycle of the manufacturing process; that is, it will be dependent upon the predetermined ratio of inlet solvent volume to outgoing brine volume. All of the aforenoted components (valve 26, timer 28, and control means 31) utilized in one embodiment of this invention, as heretofore noted, are of conventional design readily available on the open market.

Where the manufacturing or brine use process does not use specific volumes of brine, but regularly requires small volumes of brine in relation to the salt and reserve brine being stored, a conventional program-type timer is used to schedule and time the water or solvent to the wet salt storage in place of the automatic reset timer 28. Referring to FIGURE 2, it will be seen that the program timer 29 is electrically connected to the solenoid valve 26 on the solvent inlet line 20. The program timer 29 is connected at 38 to the available electric source for the plant operation from which it receives a continuous electrical supply. This electrical supply operates a synchronic motor and clock in the timer which may be adjusted to operate according to the schedule of the manufacturing or brine use process. The timer 29 by means of the aforementioned clock introduces electric current to the solenoid valve 26, thereby opening it, and maintains the valve 26 in an open position for a predetermined time period by timing the flow of electricity to the solenoid valve 26. When the program timer 29 sets in operation the opening of the solenoid valve 26 it allows a pre-set flow control valve 24 to deliver a selected rate of flow of water or other solvent to the storage chamber for an adjusted period of time.

Figure 3:
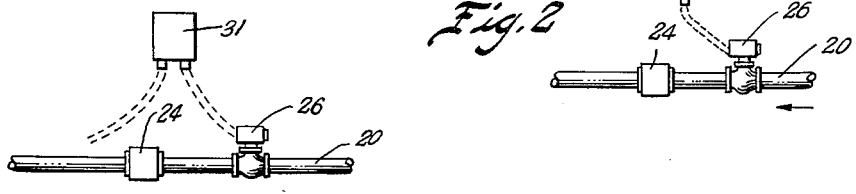
FIG. 3 illustrates a further modification of the embodiment of FIG. 1.

FIG. 3 discloses an assembly which may be employed where the manufacturing process does not use specific repeated volumes of brine and does not consume regular or consistent quantities of salt and brine. In this brine use system the supply of solvent may be directly adjusted to the brine flow being withdrawn from the wet storage chamber by connecting the solenoid valve 26 positioned on the solvent supply conduit 20 directly to control means 31 operating the brine use system. Thus, when control means 31 actuates the brine use mechanism, such as a brine pump or the like, the solenoid valve 26 opens and allows a proportionate flow of solvent to be introduced into the salt chamber through the flow control valve 24. The control means 31 may constitute an electrical circuit of a brine pump, an electrical pressure control switch governing a pressure system, or a solenoid valve controlling the automatic gravity flow from the chamber.

Many manufacturing concerns, which utilize brine in the production of their products, require regularly repeated specific volumes of saturated brine in order to carry out their processes. These processes generally employ an electrical circuit to operate the cycle of use of the brine: that is to say, the brine is introduced into the manufacturing process by an electrical motor, switch or other well known device, and such device is operated by conventional electrical control means. FIG. 1 shows the embodiment of this invention which may be used in conjunction with such a process. The automatic reset timer 28 may be wired to control means 31, operating the brine pump 33, so that timer 28 will receive an electrical impulse from control means 31 each time brine is introduced into the manufacturing process. This impulse will initiate the timer 28; and the latter will open the solenoid valve 26 for a previously adjusted time period, causing the desired quantity of fresh fluid to be introduced through the pre-set flow control valve 24. The length of the time period and the amount of incoming solvent allowed to flow per minute through the flow control valve 24 will be dependent upon the amount of solvent removed by the brine used during each cycle of the manufacturing process; that is, it will be dependent upon the predetermined ratio of inlet solvent volume to outgoing brine volume. All of the aforenoted components (valve 26, timer 28, and control means 31) utilized in one embodiment of this invention, as heretofore noted, are of conventional design readily available on the open market.

Where the manufacturing or brine use process does not use specific volumes of brine, but regularly requires small volumes of brine in relation to the salt and reserve brine being stored, a conventional program-type timer is used to schedule and time the water or solvent to the wet salt storage in place of the automatic reset timer 28. Referring to FIGURE 2, it will be seen that the program timer 29 is electrically connected to the solenoid valve 26 on the solvent inlet line 20. The program timer 29 is connected at 38 to the available electric source for the plant operation from which it receives a continuous electrical supply. This electrical supply operates a synchronic motor and clock in the timer which may be adjusted to operate according to the schedule of the manufacturing or brine use process. The timer 29 by means of the aforementioned clock introduces electric current to the solenoid valve 26, thereby opening it, and maintains the valve 26 in an open position for a predetermined time period by timing the flow of electricity to the solenoid valve 26. When the program timer 29 sets in operation the opening of the solenoid valve 26 it allows a pre-set flow control valve 24 to deliver a selected rate of flow of water or other solvent to the storage chamber for an adjusted period of time.

FIG. 3 discloses an assembly which may be employed where the manufacturing process does not use specific repeated volumes of brine and does not consume regular or consistent quantities of salt and brine. In this brine use system the supply of solvent may be directly adjusted to the brine flow being withdrawn from the wet storage chamber by connecting the solenoid valve 26 positioned on the solvent supply conduit 20 directly to control means 31 operating the brine use system. Thus, when control means 31 actuates the brine use mechanism, such as a brine pump or the like, the solenoid valve 26 opens and allows a proportionate flow of solvent to be introduced into the salt chamber through the flow control valve 24. The control means 31 may constitute an electrical circuit of a brine pump, an electrical pressure control switch governing a pressure system, or a solenoid valve controlling the automatic gravity flow from the chamber.

It will be obvious that certain modifications of the specific embodiments shown and described herein may be made without departing from the spirit and scope of this invention. For example, in the aforesaid assemblies the media of electrical connection to the brine use system has been chosen; however, it is entirely possible to use other signal connecting media, such as hydraulic or pneumatic connections. Differential pressure cells could also be used to electrically or pneumatically transmit power to a measuring device for an inlet water supply. In addition the principles of this invention are applicable to other types of dissolving salts or solid materials which are possessed of the same or similar inherent characteristics as those previously noted.

Thus, it will be seen that whatever embodiment of the invention is adopted conventional electrical equipment may be employed. By reason of this fact therefore the invention herein disclosed is possessed of important advantages such as ease of obtaining for replacement purposes various components, which are relatively inexpensive and of well known construction and operation, and therefore do not require the talents of highly skilled personnel to install such components in the liquid level control system and maintain the same in dependable working order.

Furthermore, the aforedescribed methods and apparatus for liquid level control in wet storage systems for soluble materials provide effective means for regulating the level of liquid accumulated within the chamber so that such level will remain at a substantially uniform distance above the top surface of the submerged mass of soluble material, regardless of the rate of depletion of said submerged mass.

The improved apparatus permits location thereof at a distance remote from the storage chamber, so that the disadvantages resulting from corrosion, solid deposits and the like on the components of such apparatus are eliminated.

While several particular embodiments of this invention are shown above, it will be understood that the invention is not to be limited thereto, since many modifications may be made and it is contemplated, therefore, by the appended claims to cover any such modifications as fall within the true spirit and scope of this invention.

I claim:

1. An apparatus for the wet storage of a soluble material comprising a storage chamber for a liquid solvent and a mass of soluble material submerged in the liquid accumulated within said chamber, means mounted on said chamber for the introduction of soluble material into the interior of said chamber, liquid solvent inlet means mounted on said chamber, outlet means mounted on the lower portion of said chamber for removing therefrom a saturated solution produced by the admixture of said solvent and soluble material, and control means communicating with said solvent inlet means and remotely disposed with respect to said chamber interior for controlling the amount of liquid accumulated within said chamber whereby the liquid level will remain at a substantially uniform distance from the top surface of the submerged mass of soluble material.

2. An apparatus for the wet storage of a soluble material comprising a storage chamber for a liquid solvent and a mass of soluble material submerged in the liquid accumulated within said chamber, means mounted on said chamber for the introduction of soluble material into the interior of said chamber, liquid solvent inlet means mounted on said chamber above the level of the accumulated solvent, outlet means mounted on the lower portion of said chamber for removing therefrom a saturated solution produced by the admixture of such solvent and soluble material, and automatically actuated control means communicating with said solvent inlet means and remotely disposed with respect to said chamber interior for controlling the amount of liquid accumulated within said chamber, the actuation of said control means being dependent upon the removal of the solution over a predetermined period, whereby the level of accumulated liquid will remain at a substantially uniform distance above the top surface of the mass of soluble material within said chamber.

3. An apparatus for the wet storage of a soluble material comprising a storage chamber for a liquid solvent and a mass of soluble material submerged in the liquid accumulated within said chamber, means mounted on said chamber for the introduction of soluble material into the interior of said chamber, liquid solvent inlet means mounted on said chamber above the level of the accumulated solvent, outlet means mounted on the lower portion of said chamber for removing therefrom a saturated solution produced by the admixture of said solvent and soluble material, control means communicating with said solvent inlet means and remotely disposed with respect to said chamber interior for controlling the amount of liquid accumulated within said chamber, the actuation of said control means being directly dependent upon the removal of solution from said chamber, whereby the level of accumulated liquid will remain at a substantially uniform distance above the top surface of the mass of soluble material within said chamber.

4. An apparatus for the wet storage of common salt, comprising a storage chamber for water and a mass of salt submerged in the liquid accumulated within said chamber, means mounted on the upper surface of said chamber for the introduction of salt into the interior of said chamber, water inlet means mounted on the upper portion of said chamber, outlet means mounted on the lower portion of said chamber for removing therefrom a saturated solution of brine produced by the admixture of water and salt, and control means communicating with said water inlet means and remotely disposed with respect to said chamber interior for controlling the amount of liquid accumulated within said chamber whereby the liquid level will remain at a substantially uniform distance from the top surface of the submerged salt mass.

5. An apparatus for the wet storage of a soluble material comprising a storage chamber for a liquid solvent and a mass of soluble material submerged in the liquid accumulated within said chamber; means mounted on said chamber for the introduction of soluble material into the interior of said chamber, liquid solvent inlet means mounted on the upper portion of said chamber; outlet means mounted on the lower portion of said chamber for removing therefrom a saturated solution produced by the admixture of said solvent and solvent material, and automatically actuated control means communicating with said solvent inlet means and remotely disposed with respect to said chamber interior for controlling the amount of liquid accumulated within said chamber, said control means including timing means and a solenoid valve regulated thereby, the actuation of said control means being dependent upon the removal of the solution over a predetermined period whereby the level of accumulated liquid will remain at a substantially uniform distance above the top surface of the mass of soluble material within said chamber.

6. An apparatus for the wet storage of common salt comprising a storage chamber for water and a mass of salt submerged in the liquid accumulated within said chamber; means mounted on said chamber for the introduction of salt into the interior of said chamber; water inlet means mounted on the upper portion of said chamber, outlet means mounted on the lower portion of said chamber for removing therefrom a saturated solution of brine produced by the admixture of water and salt; and control means communicating with said water inlet means and remotely disposed with respect to said chamber interior for controlling the amount of liquid accumulated within said chamber, said control means including timing means, a solenoid valve regulated by said timing means, valve means for regulating the volume of incoming water, and strainer means for protecting said solenoid valve and valve means from impurities present in the incoming water, the actuation of said control means being dependent upon the removal of brine over a predetermined period whereby the level of accumulated liquid will remain at a substantially uniform distance above the top surface of the mass of salt within said chamber.

7. A method for the wet storage of a soluble material and a liquid solvent within a chamber, the latter having solvent and soluble material inlets and an outlet for a saturated solution produced by the admixture of such solvent and soluble material, said method comprising maintaining a mass of soluble material submerged within the liquid accumulated in the chamber, introducing solvent into said chamber, determining the amount of saturated solution removed from the chamber through the outlet over a predetermined time period, and proportioning the amount of solvent introduced into the chamber during such predetermined time period whereby the level of liquid will remain at a substantially uniform distance above the top surface of the submerged mass of soluble material during given increments of said predetermined time period.

8. A method for the wet storage of common salt and water within a chamber, the latter having water and salt inlets and an outlet for brine produced by the admixture of such water and salt, said method comprising maintaining a mass of salt submerged within the liquid accumulated in the chamber, introducing water into said chamber through said inlet, determining the amount of brine removed from the chamber through said outlet over a predetermined time period and proportioning the amount of water introduced into the chamber during such predetermined time period whereby the level of liquid will remain at a substantially uniform distance above the top surface of the submerged mass of salt during given increments of said predetermined time period.

9. A method for the wet storage of a soluble material and a liquid solvent within a chamber, the latter having solvent and soluble material inlets and an outlet for the solution produced by the admixture of such soluble material and solvent, said method comprising maintaining a mass of soluble material submerged within the liquid accumulated in the chamber and proportioning the solvent introduced into the chamber to the amount of solution removed from said chamber through said outlet whereby the level of liquid will remain at a substantially uniform distance above the top surface of the submerged mass of soluble material.

10. A method for the wet storage of common salt and water within a chamber, the latter having salt and water inlets and an outlet for brine produced by the admixture of such salt and water, said method comprising maintaining a mass of salt submerged within the liquid accumulated in the chamber and proportioning the amount of water introduced into said chamber to the amount of brine removed from said chamber through said outlet whereby the level of liquid will remain at a substantially uniform distance above the top surface of the submerged mass of salt.

No references cited.